United States Patent
James et al.

(10) Patent No.: US 8,075,000 B2
(45) Date of Patent: Dec. 13, 2011

(54) COMPOSITE, HIGH TEMPERATURE, DYNAMIC SEAL AND METHOD OF MAKING SAME

(75) Inventors: Brian A. James, Humble, TX (US); John E. Schroeder, Houston, TX (US); Rome Richardson, Houston, TX (US); Lannie L. Dietle, Houston, TX (US)

(73) Assignee: Kalsi Engineering, Inc., Surgar Land, TX (US)

(*) Notice: Subject to any disclaimer, the term of this patent is extended or adjusted under 35 U.S.C. 154(b) by 257 days.

(21) Appl. No.: 11/360,831

(22) Filed: Feb. 23, 2006

(65) Prior Publication Data
US 2006/0214379 A1 Sep. 28, 2006

Related U.S. Application Data

(60) Provisional application No. 60/665,659, filed on Mar. 28, 2005.

(51) Int. Cl.
*F17J 15/32* (2006.01)

(52) U.S. Cl. ......... 277/569; 277/559; 277/589; 277/652

(58) Field of Classification Search ................. 277/569, 277/589, 559, 551, 652
See application file for complete search history.

(56) References Cited

U.S. PATENT DOCUMENTS

| | | | |
|---|---|---|---|
| 2,188,857 A | 1/1940 | Chievitz | |
| 3,497,225 A | 2/1970 | Workman | |
| 3,744,805 A | 7/1973 | Heinrich | |
| 3,837,660 A * | 9/1974 | Poggio | 277/549 |
| 3,838,862 A | 10/1974 | Fern | |
| 3,921,987 A | 11/1975 | Johnston et al. | |
| 3,929,340 A | 12/1975 | Peisker | |
| 3,973,781 A | 8/1976 | Grörich | |
| 3,984,113 A | 10/1976 | Bentley | |
| 4,094,519 A | 6/1978 | Heyn et al. | |
| 4,118,856 A | 10/1978 | Bainard et al. | |
| 4,183,543 A | 1/1980 | Antonini | |
| 4,193,606 A | 3/1980 | Iverson | |
| 4,231,579 A | 11/1980 | Scannell | |
| 4,239,243 A * | 12/1980 | Bainard et al. | 277/559 |
| 4,251,399 A * | 2/1981 | Tomoda et al. | 525/126 |
| 4,283,064 A | 8/1981 | Staab et al. | |
| 4,288,083 A | 9/1981 | Braconier | |
| 4,336,945 A | 6/1982 | Christiansen et al. | |

(Continued)

FOREIGN PATENT DOCUMENTS

GB 499480 1/1939

*Primary Examiner* — Alison Pickard
(74) *Attorney, Agent, or Firm* — Douglas W. Rommelmann; Andrews Kurth LLP

(57) ABSTRACT

A composite, dynamic seal suitable for use in a high temperature environment and method of making same. The dynamic seal includes a resilient, generally ring-shaped seal body having a first layer formed of a first resilient sealing material and a second layer formed of a second resilient sealing material. The first and second layers are preferably molded and cured together simultaneously and chemically cross-linked to each other. The first resilient sealing material is selected for its wear resistant dynamic properties and the second resilient sealing material is selected for its compression set resistant properties. Preferably, the first resilient sealing material is tetrafluoroethylene and propylene copolymer and the second resilient sealing material is fluorocarbon rubber. The first and second resilient sealing materials have compatible cure systems, preferably peroxide cure systems.

25 Claims, 4 Drawing Sheets

U.S. PATENT DOCUMENTS

| | | |
|---|---|---|
| 4,383,691 A | 5/1983 | Potter |
| 4,387,902 A | 6/1983 | Conover |
| 4,399,998 A | 8/1983 | Otto |
| 4,440,405 A | 4/1984 | Schaus et al. |
| 4,441,722 A | 4/1984 | Pichler |
| 4,451,050 A | 5/1984 | Repella |
| 4,484,753 A | 11/1984 | Kalsi |
| 4,531,747 A | 7/1985 | Miura |
| 4,542,573 A | 9/1985 | Bainard |
| 4,564,662 A | 1/1986 | Albin |
| 4,610,319 A | 9/1986 | Kalsi |
| 4,619,534 A | 10/1986 | Daly et al. |
| 4,705,277 A | 11/1987 | Repella |
| 4,729,569 A | 3/1988 | Muller et al. |
| 4,739,998 A | 4/1988 | Steusloff et al. |
| 4,750,747 A | 6/1988 | Holzer |
| 4,770,548 A | 9/1988 | Otto |
| 4,789,166 A | 12/1988 | Rericha et al. |
| 4,831,083 A * | 5/1989 | Geri et al. .................. 525/199 |
| 5,002,289 A | 3/1991 | Yasui et al. |
| 5,139,275 A | 8/1992 | Ehrmann et al. |
| 5,177,148 A * | 1/1993 | Arcella et al. .............. 525/133 |
| 5,190,299 A | 3/1993 | Johnston |
| 5,195,757 A | 3/1993 | Dahll |
| 5,202,372 A * | 4/1993 | Moggi et al. ................ 524/462 |
| 5,230,520 A | 7/1993 | Dietle et al. |
| 5,269,539 A * | 12/1993 | Martin ......................... 277/569 |
| 5,300,569 A * | 4/1994 | Drake et al. ................... 525/78 |
| 5,362,073 A | 11/1994 | Upton et al. |
| 5,427,387 A | 6/1995 | Johnston |
| 5,511,886 A | 4/1996 | Sink |
| 5,678,829 A | 10/1997 | Kalsi et al. |
| 5,692,757 A | 12/1997 | Straub |
| 5,711,534 A | 1/1998 | Bengoa et al. |
| 5,738,358 A | 4/1998 | Kalsi et al. |
| 5,791,658 A | 8/1998 | Johnston |
| 5,873,576 A | 2/1999 | Dietle et al. |
| 5,915,696 A | 6/1999 | Onuma et al. |
| 5,921,555 A | 7/1999 | Johnston |
| 6,036,192 A | 3/2000 | Dietle et al. |
| 6,105,968 A | 8/2000 | Yeh et al. |
| 6,109,618 A | 8/2000 | Dietle |
| 6,120,036 A | 9/2000 | Kalsi et al. |
| 6,123,337 A | 9/2000 | Fang et al. |
| 6,139,020 A | 10/2000 | Friend et al. |
| 6,179,296 B1 * | 1/2001 | Cawthorne et al. ........... 277/336 |
| 6,189,896 B1 | 2/2001 | Dickey et al. |
| 6,305,483 B1 * | 10/2001 | Portwood ..................... 175/371 |
| 6,315,302 B1 | 11/2001 | Conroy et al. |
| 6,334,619 B1 | 1/2002 | Dietle et al. |
| 6,382,634 B1 | 5/2002 | Dietle et al. |
| 6,494,462 B2 | 12/2002 | Dietle |
| 6,554,325 B1 | 4/2003 | Knauder |
| 6,561,520 B2 | 5/2003 | Kalsi et al. |
| 6,685,194 B2 | 2/2004 | Dietle et al. |
| 6,730,385 B1 * | 5/2004 | Tanaka et al. ................ 428/66.4 |
| 6,767,016 B2 | 7/2004 | Gobeli et al. |
| 6,803,435 B2 | 10/2004 | Coggio et al. |
| 7,052,020 B2 | 5/2006 | Gobeli et al. |
| 2001/0024016 A1* | 9/2001 | Gobeli et al. ................ 277/400 |
| 2003/0122317 A1 | 7/2003 | Andersson |
| 2004/0104536 A1 | 6/2004 | Gobeli et al. |
| 2006/0214379 A1* | 9/2006 | James et al. .................. 277/404 |

* cited by examiner

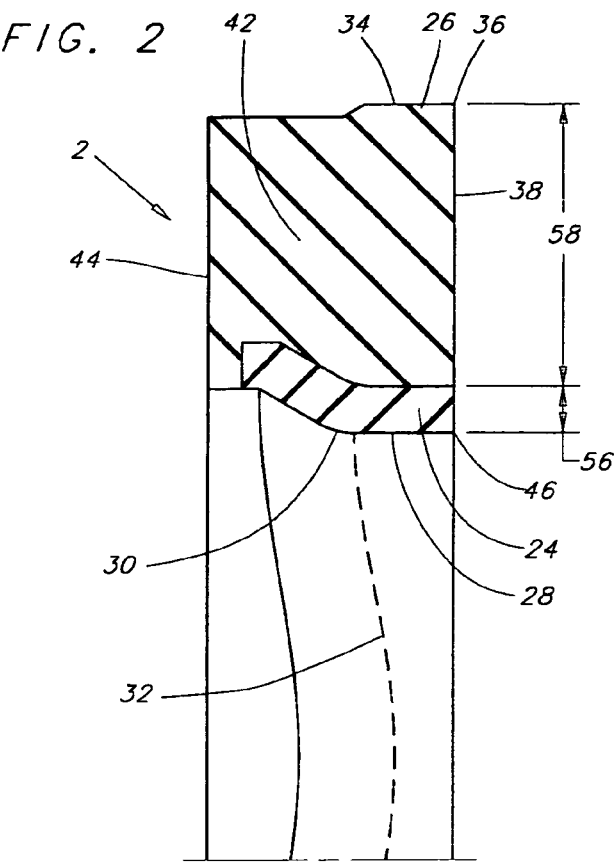
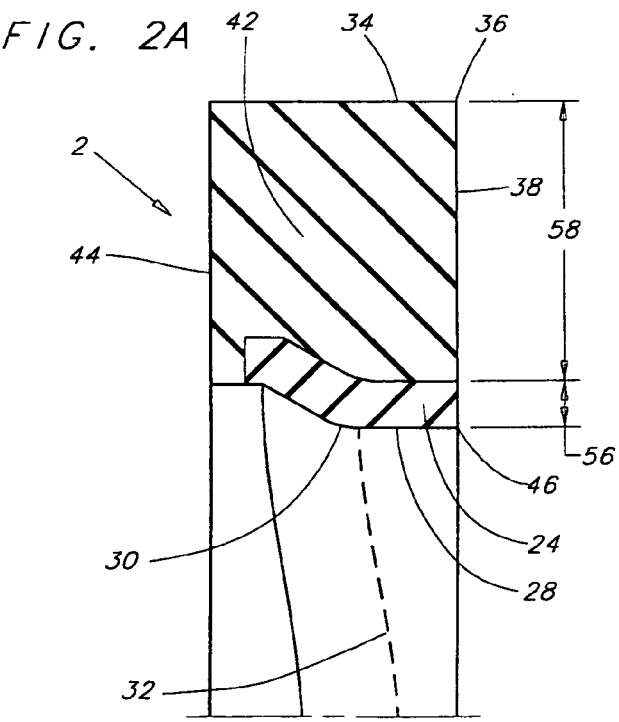

COMPOSITE, HIGH TEMPERATURE, DYNAMIC SEAL AND METHOD OF MAKING SAME

CROSS-REFERENCE TO RELATED APPLICATIONS

Applicants claim the benefit of U.S. Provisional Application Ser. No. 60/665,659, filed on Mar. 28, 2005, which provisional application is incorporated herein by reference for all purposes.

BACKGROUND OF THE INVENTION

1. Field of the Invention

The present invention relates to sealing elements for sealing between relatively movable mechanical components, and more particularly relates to rotary sealing elements for use in high temperature applications, and a method of making same.

2. Description of the Related Art a. Prior Art O-Ring Energized Lip Seals.

The Parker Hannifin Corporation manufactures a line of well-known O-ring energized two piece lip seals under the registered trademark "POLYPAK," as shown in their Product Bulletin No. 5205B-1 titled "LC Profile Seal." The POLYPAK seal is comprised of an O-ring and a lip seal shell. The O-ring is used as an expander ring that is compressed during installation to load the lips. The O-ring is often a different material from the lip seal shell, with each material selectable based on performance characteristics. In dynamic service, the O-ring is sometimes prone to dislodgement that allows leakage, as disclosed in Parker Hannifin Product Bulletin No. 5205B-1. O-ring dislodgement can also lead to contaminant ingestion and accelerated seal wear.

b. Prior Art Spring Energized Lip Seals

Many companies manufacture spring energized two piece lip seals for dynamic service, where a spring energizes the dynamic lip against a relatively movable surface of a machine component. Some examples of types of springs that are used include cantilever springs, garter springs, and canted coil springs. When such seals are used to exclude heavily contaminated environments, the springs are subject to dislodgement, causing leakage, contaminant ingestion, and accelerated seal wear. Such seals are unsuitable for applications where the differential pressure may occur in either direction. Such seals can only hold pressure when the differential pressure is acting from the side of the seal where the springs are located, so that the pressure acts interior of the dynamic lip to force the dynamic lip tighter against the relatively movable surface. When differential pressure occurs in the opposite direction, the pressure lifts the seal away from the relatively movable surface, allowing fluid to blow past the lip.

c. Prior Art Hydrodynamic Rotary Seals

Kalsi Engineering, Inc. markets a line of well-known patented dynamic seals under the registered trademark "KALSI SEALS." These seals, which are hydrodynamically lubricated seals of one-piece construction, are widely used in oil well drilling and in other rotary equipment. These seals exploit the principles of hydrodynamic lubrication and contaminant exclusion that are set forth in U.S. Pat. Nos. 4,610,319; 5,230,520; 5,678,829; 5,738,358; 6,109,618; 6,120,036; 6,315,302; and 6,382,634. These patents are incorporated herein by reference for all purposes. The basic principle of hydrodynamic lubrication and contaminant exclusion of the KALSI SEALS brand seal product line is given in U.S. Pat. No. 4,610,319. U.S. Pat. No. 5,230,520 discloses a static lip that provides reduced seal distortion, improved seal stability and improved abrasive exclusion. U.S. Pat. No. 5,678,829 discloses an environmental side groove that can be used to reduce interfacial contact pressure to promote better lubrication and allow higher speeds. U.S. Pat. No. 5,738,358 discloses a dual modulus construction that can be used to reduce interfacial contact pressure to promote better lubrication and allow higher speeds and higher differential pressures. U.S. Pat. No. 6,109,618 discloses an aggressive hydrodynamic geometry that lubricates better under adverse conditions. U.S. Pat. No. 6,120,036 discloses a chamfered lip construction that can be used to control interfacial contact pressure, and that resists extrusion damage. U.S. Pat. No. 6,315,302 discloses an axially constrained geometry that provides improved abrasive exclusion in applications having little or no differential pressure, or low levels of reversing differential pressure. U.S. Pat. No. 6,382,634 discloses a geometry that provides additional sacrificial material to compensate for abrasive wear.

The rotary seals that are marketed by Kalsi Engineering are installed with radial interference (i.e. compression), and seal by blocking the leak path. Ultimate life is governed by the ability of the seal to remain resilient and maintain adequate interfacial contact pressure (i.e. to maintain sufficient contact force against the mating counter-surface of the shaft). Loss of resiliency is called compression set. Compression set is a measurement of the lack of rebound after a specified period of compression, and is usually expressed as a percentage of the original compression. As with most forms of elastomer degradation, compression set is worse at higher temperatures, and is influenced by media compatibility.

The single material, homogeneous elastomeric rotary seals manufactured according to FIGS. 1, 2, 2A, 3 and 5 of U.S. Pat. No. 5,230,520 are typically constructed of highly saturated nitrile elastomer, also known as HSN or HNBR, but can also be made from FKM (fluorocarbon rubber) or TFE/P (Tetrafluoroethylene and Propylene Copolymer). Testing has shown that when such seals are constructed from HSN, they are only appropriate for temperatures of up to about 300° F. Beyond that temperature, hardening and accelerated compression set significantly limits effective life. Such seals are widely used in downhole oil well drilling equipment. As oil wells get deeper, the need for an economical rotary seal that can withstand temperatures in the range of 300° to 400° F. has become critical. Increasingly higher rotary speeds are also being used for oil well drilling, which drives up the actual seal temperature. Conventional FKM elastomers have good compression set resistance and chemical resistance at high temperature, but are unsuitable for use in an oilfield rotary seal of the type shown in FIGS. 1, 2, 2A, 3 and 5 of U.S. Pat. No. 5,230,520 because of severe cracking of the dynamic interface that occurs at temperatures as low as 300° F., and because conventional FKM has poor abrasion resistance characteristics that make it unsuitable for sealing high differential pressures. FKM is often referred to as "VITON," which is a trademark of DuPont Performance Elastomers. The elastomer TFE/P (commonly referred to by the Asahi Glass Co., Ltd. trademark "AFLAS") is a fluorocarbon polymer that has good high temperature dynamic properties and good chemical resistance, but is not well suited for use as a single material downhole rotary seal of the type shown in FIGS. 1, 2, 2A, 3 and 5 of U.S. Pat. No. 5,230,520 due to its extremely poor compression set resistance characteristics. Compared to FKM, TFE/P has substantially less high temperature compression set resistance (i.e. TFE/P has higher compression set than FKM in high temperature conditions).

HSN dual modulus seals constructed in accordance with FIG. 9 of U.S. Pat. No. 5,738,358 provide a lower lip loading than those of U.S. Pat. No. 5,230,520, and therefore allow cooler operation at higher rotary speeds. The dual modulus construction is also more resistant to lubricant pressure-induced extrusion damage. In low differential pressure conditions, or in conditions of low level reversing differential pressure, the contact pressure distribution of such dual modulus seals isn't suitable for abrasive exclusion unless the chamfered lip construction of U.S. Pat. No. 6,120,036 is employed. In high differential pressure conditions, the lubricant pressure-induced flattening of the chamfered lip construction may compromise abrasive exclusion. As used herein, "modulus" or "elastic modulus" of an elastomer can be estimated in accordance with FIG. 1 of ASTM D 1415-83, Standard Test Method For Rubber Property—International Hardness.

HSN dual modulus seals constructed in accordance with FIG. 9 of U.S. Pat. No. 5,738,358 are very expensive to produce, which has limited their widespread use. The best production method has proven to be a multi-step method, which is labor intensive. The higher modulus inner part, which is referred to as the "insert" is first molded and partially cured (i.e. partially vulcanized), then cooled, trimmed and inspected. After trimming, several proprietary labor-intensive processes are used to ensure that the insert will effectively bond to the lower modulus energizing material. During the final molding, the partially cured insert is manually inserted into the hot mold cavity, and rotated to achieve proper timing between the wavy shape of the mold and the wavy shape of the insert. Only then can the lower modulus material be introduced into the mold cavity for final molding and curing. After this, the finished part must be re-cooled, re-trimmed and re-inspected. Various kinds of defects can occur at nearly every manufacturing step, and as a result the rejection rate is often high. The manufacturing process is not considered desirable for use with very thin inserts.

Several attempts have been made to produce dual modulus seals using two different peroxide cure-based HSN materials in a one step molding process, where the two uncured materials are molded simultaneously together in the mold cavity. The uncured higher modulus material doesn't always stay in place, and becomes dislodged and/or distorted due to the molding pressure and the movement of the uncured lower modulus material during the molding process. Even worse, the higher modulus material doesn't bond well to the lower modulus material, and could separate if ever used in actual service. In fact, the bond can be so poor that the two layers can sometimes be stripped apart by hand. In any case, the bond has been weaker than that of either of the two HSN materials.

It is desirable to have a rotary seal suitable for sealing between two members allowed to move relative to each other for use in a high temperature environment, including temperatures exceeding 300° F. It is further desirable that the rotary seal partition a fluid on one side of the seal from a second fluid on a second side of the seal. It is desirable that the rotary seal remain resilient and maintain adequate interfacial contact pressure with the mating counter-surface of the rotatable member.

SUMMARY OF THE INVENTION

The present invention is a composite rotary seal suitable for use in a high temperature environment, including temperatures exceeding 300° F. The composite rotary seal is suitable for sealing between two members allowed to move relative to each other. Preferably, the composite rotary seal is a dynamic seal for partitioning one fluid from another. The composite dynamic seal remains resilient and maintains adequate interfacial contact pressure with the mating counter-surface of the rotatable member.

The preferred embodiment of the present invention includes a resilient, generally ring-shaped seal body having a first layer formed of a first resilient sealing material and a second layer formed of a second resilient sealing material. The first layer defines at least a portion of a dynamic sealing surface having a dynamic sealing lip and the second layer defines at least a portion of a static sealing surface. The first and second layers are integrally connected and are preferably molded and cured together simultaneously.

Preferably, the first resilient sealing material is selected for its wear resistant dynamic properties, and has a predetermined modulus of elasticity. The second resilient sealing material is preferably selected for its compression set resistant properties and has a modulus of elasticity that is approximately equal to or less than that of the first resilient sealing material. Preferably, the first layer is relatively thin compared to the thickness of the second layer. In the preferred embodiment, the first resilient sealing material is tetrafluoroethylene and propylene copolymer and the second resilient sealing material is fluorocarbon rubber.

BRIEF DESCRIPTION OF THE SEVERAL VIEWS OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate typical embodiments of this invention, and are therefore not to be considered limiting of its scope, for the invention may admit to other equally effective embodiments.

In the drawings:

FIG. 2 is a fragmentary sectional view of a composite dynamic seal according to another preferred embodiment of the present invention, the composite dynamic seal having an inner dynamic sealing material layer and an outer static sealing material layer, the composite dynamic seal shown in an uncompressed condition and adapted for radial sealing;

FIG. 2A is a fragmentary sectional view of a composite dynamic seal similar to the seal of FIG. 2 but not having a static sealing lip, the seal being shown in the uncompressed condition;

DESCRIPTION OF THE PREFERRED EMBODIMENTS

Figure 1:
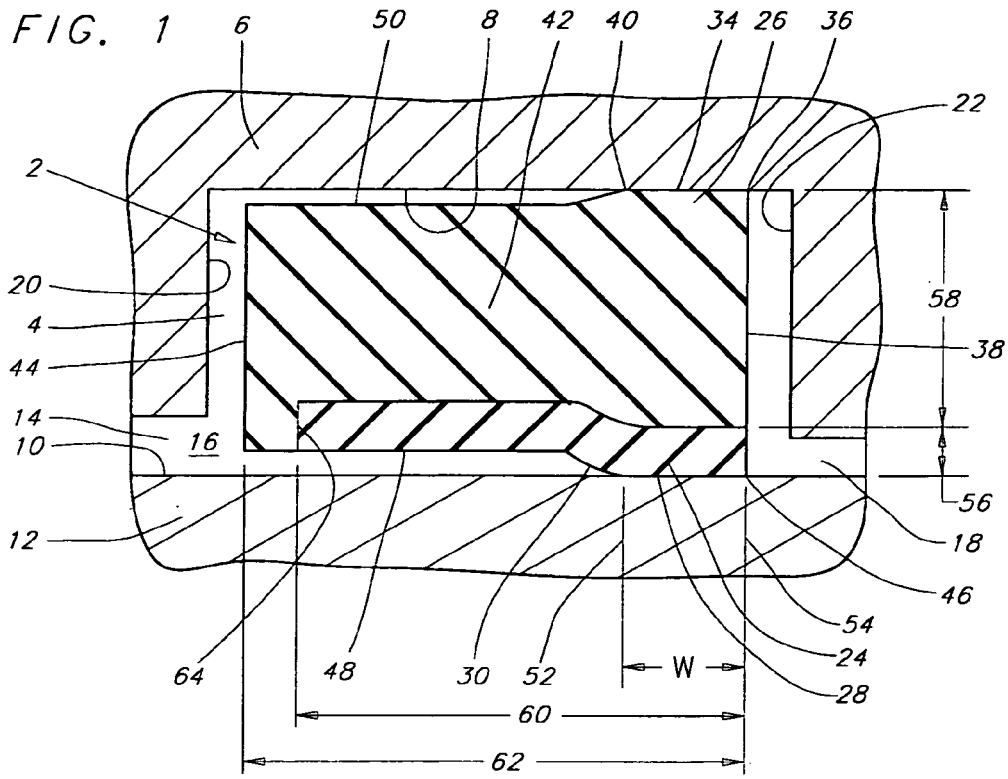
FIG. 1 is a fragmentary cross-sectional view of a composite dynamic seal according to a preferred embodiment of the present invention, the composite dynamic seal having a dynamic sealing material layer and a static sealing material layer, the composite dynamic seal shown in a compressed condition within a seal groove and establishing hydrodynamic sealing engagement with a relatively rotatable surface in the absence of differential fluid pressure.

The composite dynamic seal according to the preferred embodiments of the present invention is generally referred to as reference number 2 in the drawings. The drawings illustrate various embodiments of the composite dynamic seal 2 adapted for axial sealing and radial sealing as will be described below. FIGS. 1A and 1B represent the uninstalled cross-sectional configuration of the preferred embodiments of the composite dynamic seal 2 as configured for radial sealing. FIGS. 1C and 1D represent the uninstalled cross-sectional configuration of the preferred embodiments as configured for axial sealing. Features throughout this specification that are represented by like numbers have the same basic function. For orientation purposes, it should be understood that in the cross-sections of FIGS. 1-1D, and other figures herein, the respective cross-sectional cutting planes pass through the longitudinal axis of the illustrated item or items.

Figure 1A:
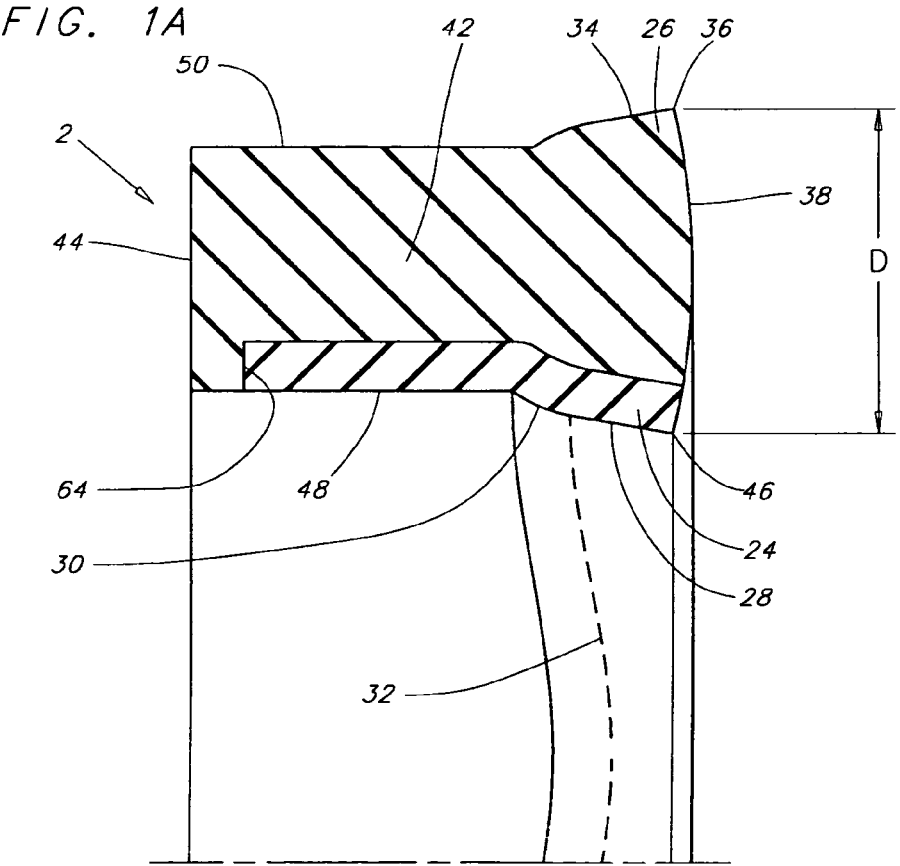
FIGS. 1A and 1B are fragmentary sectional views of first and second embodiments of the composite dynamic seal shown in FIG. 1, the composite dynamic seals shown in an uncompressed condition and adapted for radial sealing.
Figure 1B:
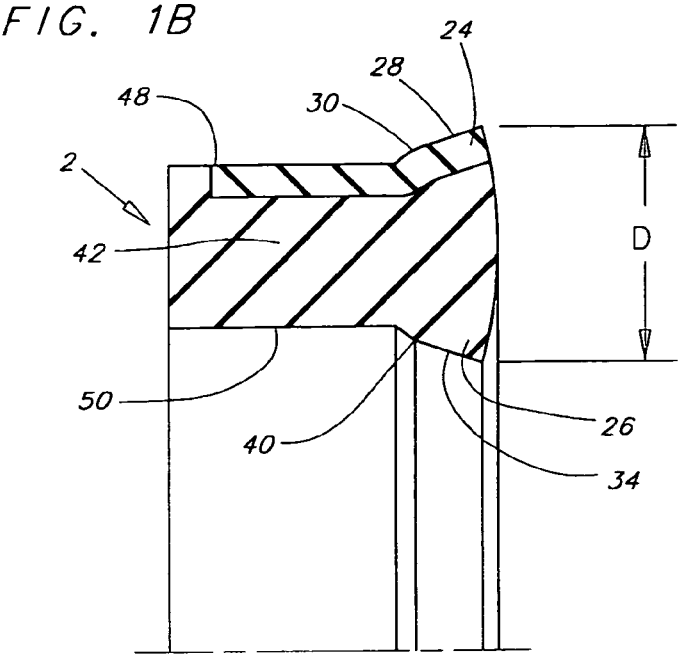
Figure 1C:
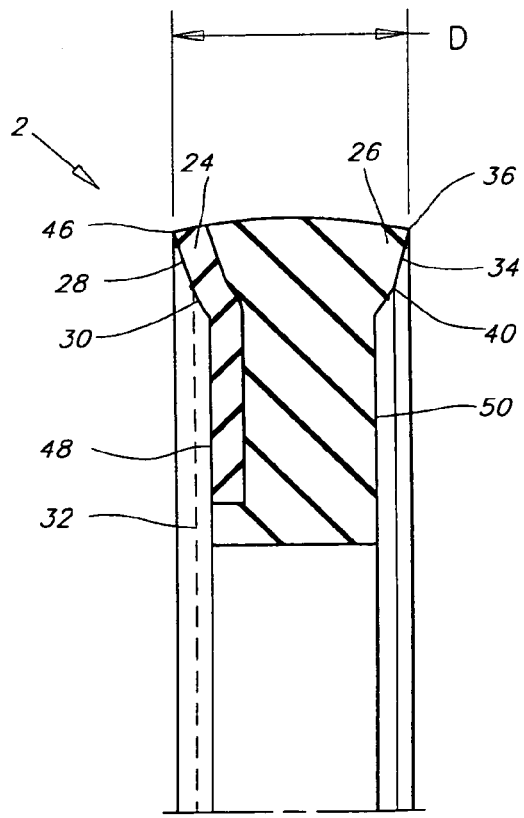
FIGS. 1C and 1D are fragmentary sectional views of third and fourth embodiments of the composite dynamic seal shown in FIG. 1, the composite dynamic seals shown in an uncompressed condition and adapted for axial sealing.
Figure 1D:
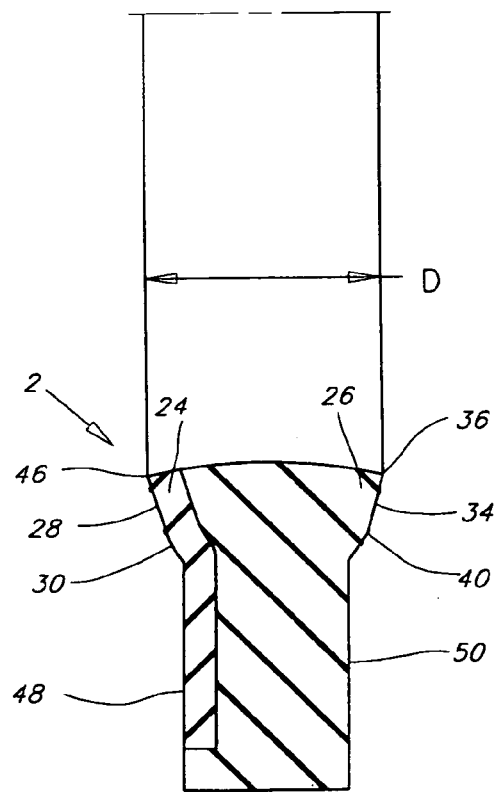

In the fragmentary transverse cross-section view of FIG. 1, the preferred embodiment of the composite dynamic seal 2 is preferably located in and positioned by a circular seal groove 4 defined by a first machine component 6 (such as a housing) and compressed between groove counter-surface 8 of circular seal groove 4 and relatively rotatable surface 10 of a second machine component 12. The compression initiates a static sealing relationship with groove counter-surface 8 and relatively rotatable surface 10 in the same manner as the compression of any conventional interference-type seal, such as an O-ring. Groove counter-surface 8 and relatively rotatable surface 10 are in generally opposed relation to one another. First machine component 6 and second machine component 12 together typically define at least a portion of a lubricant chamber 14 for locating a first fluid 16.

Circular seal groove 4 preferably includes a first groove wall 20 and a second groove wall 22 that are in generally opposed relation to one another. In the hydrodynamic seal industry, first groove wall 20 is often referred to as the "lubricant-side gland wall," and second groove wall 22 is often referred to as the "environment-side gland wall." Although first groove wall 20 and second groove wall 22 are shown to be in fixed, permanent relation to one another, such is not intended to limit the scope of the invention, for the invention admits to other equally suitable forms. For example, first groove wall 20 and/or second groove wall 22 could be configured to be detachable from first machine component 6 for ease of maintenance and repair, but then assembled in more or less fixed location for locating dynamic seal 2.

The compressed configuration of the dynamic seal 2 shown in FIG. 1 is representative of its shape when the pressure of first fluid 16 is substantially the same as the pressure of second fluid 18. If the pressure of first fluid 16 was substantially higher than the pressure of the second fluid 18, the resulting differential pressure would force the dynamic seal 2 against the second groove wall 22. If the pressure of second fluid 18 was substantially higher than the pressure of the first fluid 16, the resulting differential pressure would force the dynamic seal 2 against the first groove wall 20.

Dynamic seal 2, which is of generally ring-shaped configuration, is used to partition the first fluid 16 from the second fluid 18, and to prevent intrusion of the second fluid 18 into the first fluid 16. The first fluid 16 is preferably exploited in this invention to lubricate the dynamic sealing interface between dynamic seal 2 and relatively rotatable surface 10, and is preferably a liquid-type lubricant such as a synthetic or natural oil, although other fluids including greases, water, and various process fluids are also suitable for lubrication of dynamic seal 2 in some applications. The second fluid 18 may be any type of fluid desired, such as a lubricating media, a process media, an environment, oilfield drilling fluid, etc. Relatively rotatable surface 10 can take the form of an externally or internally oriented, substantially cylindrical surface, as desired, with dynamic seal 2 compressed radially between groove counter-surface 8 and relatively rotatable surface 10. Alternatively, relatively rotatable surface 10 can take the form of a substantially planar surface, with dynamic seal 2 compressed axially between groove counter-surface 8 and relatively rotatable surface 10 of substantially planar form. Illustrations of the preferred embodiment as configured for radial compression are shown in FIGS. 1A and 1B. Illustrations of the preferred embodiment as configured for axial compression are shown in FIGS. 1C and 1D.

Dynamic seal 2 preferably incorporates a dynamic sealing lip 24 and a static sealing lip 26 that are of generally circular configuration, and in generally opposed relation to one another as shown in FIGS. 1-1D, to minimize the potential for twisting of the seal within the gland, in accordance with the teachings of commonly assigned U.S. Pat. No. 5,230,520.

Dynamic seal 2 defines a dynamic sealing surface 28 which is disposed in facing relation with the relatively rotatable surface 10. The width of dynamic sealing surface 28 preferably varies around the circumference of the seal as best shown in FIG. 1A. Dynamic seal 2 also preferably defines a hydrodynamic inlet curvature 30 for facing the relatively rotatable surface 10. Hydrodynamic inlet curvature 30 preferably varies in position around the circumference of dynamic seal 2.

The non-circular, wavy positional variation of hydrodynamic inlet curvature 30 can take any form which is skewed with respect to the direction of relative rotation, and could take the form of one or more repetitive or non-repetitive convolutions/waves of any form including a sine, saw-tooth or square wave configuration, or plural straight or curved segments forming a tooth-like pattern, or one or more parabolic curves, cycloid curves, witch/versiera curves, elliptical curves, etc. or combinations thereof, including, but not limited to, any of the design configurations shown in U.S. Pat. Nos. 4,610,319 and 6,109,618.

The cross-sectional profile of dynamic sealing surface 28 can be any suitable shape, including straight or curved lines or line combinations. A blend location 32 preferably exists between hydrodynamic inlet curvature 30 and dynamic sealing surface 28. Blend location 32 is represented by a dashed line in FIGS. 1A and 1C. Preferably, blend location 32 is a location of tangency between hydrodynamic inlet curvature 30 and dynamic sealing surface 28.

Dynamic seal 2 also preferably defines static sealing surface 34 which is generally circular and in generally opposed relation to dynamic sealing surface 28.

A static exclusionary intersection 36 is preferably provided at the intersection between second seal end 38 and static sealing surface 34 for excluding the second fluid 18. The static sealing surface 34 preferably defines a lubricant-side edge 40 and preferably defines an environment-side edge that is established by static exclusionary intersection 36.

In the uncompressed condition thereof, dynamic sealing surface 28 and/or static sealing surface 34 may, if desired, be of sloped configuration, angulated with respect to the respective mating surfaces of the first machine component 6 and second machine component 12, in accordance with the teachings of commonly assigned U.S. Pat. No. 6,767,016. The sloping of static sealing surface 34 and/or dynamic sealing surface 28 increases contact pressure between dynamic sealing lip 24 and relatively rotatable surface 10 near dynamic exclusionary intersection 46, for improved exclusion of the second fluid 18.

Dynamic seal 2 defines an annular seal body 42. As shown in FIG. 1, dynamic seal 2 has a first seal end 44 facing toward the first fluid 16 and a second seal end 38 facing toward the second fluid 18. In the hydrodynamic seal industry, first seal end 44 is often referred to as the "lubricant-end," and second seal end 38 is often referred to as the "environment-end." The first seal end 44 is preferred to be in generally opposed relation to the second seal end 38. Installation of dynamic seal 2 compresses dynamic sealing lip 24 against the relatively rotatable surface 10 and establishes an interfacial contact footprint of generally circular form and having a width dimension W that preferably varies in size about the circumference of dynamic seal 2. Dynamic sealing surface 28, in the preferred embodiment, extends from dynamic exclusionary intersection 46 to hydrodynamic inlet curvature 30. The geometry of hydrodynamic inlet curvature 30 can take any suitable design configuration that results in a gradually converging, non-circular geometry for promoting hydrodynamic wedging without departing from the spirit or scope of the present invention, including any type of curve, such as but not limited to a radius, a portion of an ellipse, a portion of a sine wave curve, a portion of a parabolic curve, a portion of a cycloid curve, a portion of witch/versiera curves, or combinations thereof, etc.

Referring to FIG. 1, dynamic seal 2 preferably defines a dynamic control surface 48 for facing the relatively rotatable surface 10, and also preferably defines a static control surface 50 for facing the groove counter-surface 8. Dynamic control surface 48 cooperates with the relatively rotatable surface 10, and static control surface 50 cooperates with groove counter-surface 8, to prevent undue twisting of the installed seal within the circular seal groove 4.

Dynamic seal 2 defines a depth dimension D from static sealing surface 34 to dynamic sealing surface 28, and also defines a seal body length 62 from first seal end 44 to second seal end 38. Dynamic exclusionary intersection 46 is preferably an abrupt exclusionary geometry adapted to be exposed to the second fluid 18 for excluding intrusion of second fluid 18, in accordance with the teachings of U.S. Pat. No. 4,610,319.

When relative rotation is absent, a liquid tight static sealing relationship is maintained at the interface between dynamic sealing lip 24 and relatively rotatable surface 10, and between static sealing lip 26 and groove counter-surface 8. When relative rotation occurs between circular seal groove 4 and relatively rotatable surface 10, the dynamic seal 2 preferably remains stationary with respect to groove counter-surface 8 and maintains a static sealing relationship therewith, while the interface between dynamic sealing lip 24 and relatively rotatable surface 10 becomes a dynamic sealing interface such that relatively rotatable surface 10 slips with respect to dynamic sealing lip 24 at a given rotational velocity. The relative rotation direction is normal (perpendicular) to the plane of the cross-section depicted in FIG. 1.

In the installed condition as shown in FIG. 1, dynamic sealing lip 24 deforms to establish an interfacial contact footprint against relatively rotatable surface 10. This footprint has a width dimension W that preferably varies in size about the circumference of dynamic seal 2 substantially in time with the positional variation of the hydrodynamic inlet curvature 30. The first footprint edge 52 of the interfacial contact footprint is preferably non-circular; i.e. wavy, due to the positional variation of the hydrodynamic inlet curvature 30 and, in conjunction with the deformed shape of dynamic sealing lip 24, produces a hydrodynamic wedging action in response to relative rotation between the dynamic seal 2 and the relatively rotatable surface 10. This hydrodynamic wedging action wedges a film of lubricating fluid (i.e. first fluid 16) into the interfacial contact footprint between the dynamic sealing lip 24 and the relatively rotatable surface 10 for lubrication purposes, which reduces wear, torque and heat generation.

The second footprint edge 54 (sometimes called the "environment edge") of the interfacial contact footprint is preferably substantially circular, and therefore does not produce a hydrodynamic wedging action in response to relative rotation between the dynamic seal 2 and the relatively rotatable surface 10, thereby facilitating exclusion of second fluid 18.

At least a portion of dynamic sealing lip 24 is made from a first resilient sealing material layer 56 selected for its wear resistant characteristics, and having a predetermined modulus of elasticity. A second resilient sealing material layer 58 is also provided that has a modulus of elasticity that is preferably approximately equal to or less than that used to form the first resilient sealing material layer 56. The first resilient sealing material layer 56 is relatively thin in comparison to the thickness of the second resilient sealing material layer 58.

When the dynamic seal 2 experiences a differential pressure such that the pressure of the lubricant 16 exceeds that of the second fluid 18, the second seal end 38 is forced against the second groove wall 22. Since the second seal end 38 preferably has the same flat shape as the groove wall 22, the wall 22 provides support against the pressure at all points except at the extrusion gap existing between the rotatable surface 10 and the lower edge of the groove wall 22. Preferably, this extrusion gap is relatively small so that the seal material can bridge it and resist the pressure. It is known in the art that at high pressure, a small portion of the sealing lip tends to bulge or extrude into the extrusion gap and that pulsating pressure and runout can flex the extruded material resulting extrusion damage.

In the preferred embodiment of the present invention, the extrusion resistance at the dynamic sealing lip 24 is primarily controlled by the modulus of elasticity of the first resilient sealing material layer 56, but the interfacial contact pressure between the dynamic sealing lip 24 and the relatively rotatable surface 10 is largely controlled by the modulus of elasticity of the second resilient sealing material layer 58, because it is the thicker of the two layers. The material interface between the first resilient sealing material layer 56 and the second resilient sealing material layer 58 can be of any suitable form.

It is widely understood that the higher the modulus of elasticity of the sealing material, the more resistant the seal is to high-pressure extrusion damage. The seal of FIG. 1, and the seals of other figures herein, may employ a second resilient sealing material layer 58 having a lower modulus of elasticity compared to the material of the first resilient sealing material layer 56. When the second resilient sealing material layer 58 is made from a material that has a lower modulus than that of the first resilient sealing material layer 56, relatively low breakout torque and running torque occur due to the reduced interfacial contact pressure provided by the modulus of the second resilient sealing material layer 58. The low running torque minimizes running temperature, which moderates temperature-related seal degradation.

With the prior art geometry of FIG. 9 of commonly assigned U.S. Pat. No. 5,738,358, the interfacial contact pressure near the environment-end of the seal can be low in applications with little or no differential pressure, resulting in poor environmental exclusion. This can be corrected by implementing the exclusion edge chamfer of U.S. Pat. No. 6,120,036, or by implementing the tapered dynamic surface and/or convex end of commonly assigned U.S. Pat. No. 6,767,016. With the dual material seals of the present invention, another way of combating the problem of low interfacial contact pressure near the dynamic exclusionary intersection 46 is to make the second resilient sealing material layer 58 from a material that has a modulus of elasticity that is roughly the same as that of the first resilient sealing material layer 56. This makes the interfacial contact pressure equivalent to that of a single material seal.

One of the primary purposes of the dual material construction of the present invention is to achieve a seal construction that is suitable for high temperature operation, compared to the prior art. The dual material composite seal 2 of the present invention is preferably formed of FKM and TFE/P elastomers having compatible compounding and compatible cure systems that can be molded together in a one step process to create a dynamic seal 2 having a second resilient sealing material layer 58 made from FKM and a first resilient sealing material layer 56 constructed from TFE/P. The result is preferably a seal that is primarily made up of FKM, but has a relatively thin TFE/P layer that defines at least a portion of dynamic sealing surface 28. This allows the seal 2 to exploit the best characteristics of both materials, so that the strengths of one material compensate for the weaknesses of the other. The good dynamic running properties of the TFE/P compensate for the poor dynamic running qualities of the FKM by isolating, or substantially isolating, the FKM from the relatively rotatable surface 10. The good compression set resistance properties of the FKM-based second resilient sealing material layer 58 compensates for the poor compression set resistance properties of the TFE/P-based first resilient sealing material layer 56.

Alternatively, silicone-type elastomers can be used to form the second resilient sealing material layer 58. As with FKM, silicone-type elastomers have excellent compression set resistance, but poor abrasive resistance.

It is preferred that the first layer length 60 be shorter than the seal body length 62, because the length difference between the first resilient sealing material layer 56 and the second resilient sealing material layer 58 helps to hold the first resilient sealing material layer 56 in place during the molding process. Also, bonding that occurs between the first resilient sealing material layer 56 and the internal shoulder 64 of the second resilient sealing material layer 58 helps to ensure the structural integrity of dynamic seal 2 by helping to prevent separation between the first resilient sealing material layer 56 and the second resilient sealing material layer 58.

In summary, the preferred embodiment of the present invention is a dynamic seal that has a first relatively thin portion of a high temperature material with good dynamic running properties homogeneously bonded with a second, thicker portion of a material having a good compression set resistance. This arrangement allows the thicker second portion to compensate for the potentially poor compression set resistance of the first thin portion, while the thin first portion protects the second, thicker portion from abrasive damage by virtue of the good dynamic running properties of the first thin portion.

Unlike the prior art spring-energized seals, the present invention is preferably suitable for applications where the differential pressure may occur in either direction. Unlike the prior art O-ring energized seals, the present invention preferably has no loose energizer that can become dislodged in service.

It has previously been mentioned that the present invention is suitable for both radial compression arrangements and axial compression arrangements. In the case of very large diameter seals, dynamic sealing surface 28 and dynamic control surface 48 can simply be manufactured as generally internally oriented surfaces, with dynamic sealing surface 28 configured for sealing against a relatively rotatable surface 10 defining an externally oriented cylindrical surface. The cross-section of large diameter seals can be rotated 90° so that dynamic sealing surface 28 becomes a generally axially oriented surface configured for sealing against a relatively rotatable surface 10 of substantially planar form, or can be rotated 180° so that dynamic sealing surface 28 becomes an externally oriented surface configured for sealing against a relatively rotatable surface 10 defining an internally oriented cylindrical surface. The relative torsional stiffness of small diameter seals is much higher, and for small diameter seals, the dynamic sealing surface 28 should be pre-oriented in the desired configuration at the time of manufacture.

FIGS. 1A-1D show that the basic concept of the preferred embodiment can be configured for dynamic sealing against a shaft, a bore, or a face without departing from the spirit or essence of the invention.

FIG. 1A is a fragmentary cross-sectional view of uninstalled dynamic seal 2 adapted for being compressed in a radial direction for sealing against a relatively rotatable surface of external cylindrical form, such as the exterior surface of a shaft. Dynamic sealing surface 28, hydrodynamic inlet curvature 30 and dynamic control surface 48 are generally internally oriented surfaces, with dynamic sealing surface 28 configured for sealing against an external cylinder.

FIG. 1B is a fragmentary cross-sectional view of uninstalled dynamic seal 2 adapted for being compressed in a radial direction for sealing against a relatively rotatable surface of internal cylindrical form, such as a bore. Dynamic sealing surface 28, hydrodynamic inlet curvature 30 and dynamic control surface 48 are externally oriented surfaces, with dynamic sealing surface 28 configured for sealing against a bore.

FIGS. 1C and 1D are fragmentary cross-sectional views of uninstalled dynamic seal 2 adapted for being compressed in an axial direction for sealing against a relatively rotatable surface of substantially planar form, and clearly illustrate that the present invention may also be used in face-sealing arrangements. Dynamic sealing surface 28, hydrodynamic inlet curvature 30 and dynamic control surface 48 are generally axially oriented surfaces, with dynamic sealing surface 28 configured for sealing against a face. In FIG. 1C, the dynamic sealing surface 28, hydrodynamic inlet curvature 30 and dynamic exclusionary intersection 46 are positioned for having the first fluid 16, i.e. a lubricating fluid, toward the inside of the seal, and in FIG. 1D they are positioned for having the first fluid 16 toward the outside of the seal.

FIGS. 2 and 2A illustrate simplifications of the preferred embodiments of FIGS. 1-1D. In the embodiments of FIGS. 2 and 2A, the dynamic sealing surface 28 and static sealing surface 34 are not tapered. The first resilient sealing material layer 56 is located inside second resilient sealing material layer 58, and dynamic seal 2 is configured for sealing against the relatively rotatable surface of a shaft.

As stated above, the preferred embodiment of the present invention includes first and second resilient sealing material layers 56 and 58, respectively, made of TFE/P and FKM, respectively. Preferably, the TFE/P and FKM elastomers have compatible cure systems, preferably chemically compatible cure systems. Preferably, the compatible cure systems of the TFE/P and FKM elastomers are peroxide vulcanizing agents.

Additionally, the compounding of the TFE/P and FKM elastomers is preferably compatible.

A vulcanizing agent is a chemical that causes the chemical crosslinking of elastomer molecule polymer chains when heated during the molding process. This vulcanization transforms the unvulcanized material from a tacky, soft thermoplastic state into a strong, elastic state. As used herein, the words "crosslinking," "curing" and "vulcanization" all have the same meaning, and are interchangeable. Examples of elastomer cure systems are peroxide cure, sulfur cure and bisphenol cure.

Compounding an elastomer pertains to the "recipe" of the various agents or ingredients to be used in the development of the rubber compound to create the desired mechanical properties of the finished product. Every recipe contains various ingredients, each having a specific function either in the processing, vulcanization, or end use of the product. In addition to the base elastomers (i.e., FKM, TFE/P and EPDM), other compounding agents include fillers (i.e., carbon black, silica and calcium carbonate), processing aids (i.e., various waxes, oils and plasticizers), antidegradants (i.e., antioxidants and antiozonants), vulcanizing agents (i.e., various sulfurs and peroxides, and bisphenol), accelerators (i.e., amines, guanides, and thioureas), and activators (i.e., zinc oxides and stearic acid). It is to be understood that the effects of the ingredients used are understood by those of ordinary skill in the art of compounding elastomers. Some compounding agents, such as plasticizers and oils, may inhibit the crosslinking between the two different elastomeric compounds. Thus, the addition of such compounding agents to the elastomeric compound will result in non-compatible compounds.

The first resilient sealing material layer 56 is preferably composed of CDI TFE/P compound 904-80, having a nominal Shore hardness of about 80 a. The second resilient sealing material layer 58 is preferably composed of CDI FKM compound 901-80 or 901-75, having a nominal Shore hardness of about 80 a or about 75 a, respectively. The preferred materials have compatible compounding and a peroxide vulcanizing agent, and have approximately the same hardness. The preferred CDI materials are available from CDI Seals of Humble, Tex.

Preferably, during molding of the composite dynamic seal 2, the unvulcanized material for forming the first resilient sealing material layer 56, and the unvulcanized material for forming the second resilient sealing material layer 58 are placed in the mold together, and molded simultaneously. Bonding of the preferred materials between the first resilient sealing material layer 56 and the second resilient sealing material layer 58 is outstanding, even without using a bonding agent. During tests to attempt to rip the two materials apart, the bond between the two materials held, and the FKM material ripped. By utilizing an FKM compound and a TFE/P compound with cure systems that are compatible to both compounds, the mutual crosslinking of the elastomeric chains that exist in the two compounds was promoted, such that the two compounds homogeneously bonded to each other. This is believed to work because the compounding of TFE/P and FKM are compatible, although it is not necessarily possible to do this with just any combination of elastomer compounds having the same basic type of cure systems.

As described previously, this is much different than what occurs when two HSN materials with a peroxide cure system are molded using the same simultaneous molding technique. When the inventors tried compression molding using two different unvulcanized peroxide-cure HSN materials, the bond between the two materials was weak and virtually non-existent. When an attempt was made to rip the two HSN materials apart, they parted cleanly at the bond with no ripping of material, leaving smooth surfaces where the two materials had once interfaced. When tested in rotary conditions, the layers of such HSN seals often separated.

It is believed that the reason peroxide-cure FKM and peroxide-cure TFE/P homogeneously bond together, as opposed to peroxide-cure HSN to peroxide-cure HSN, is because there are fewer additives in the compounding of FKM and TFE/P that can interfere with the bond. Thus, in addition to having compatible cure systems, the FKM and TFE/P have compatible compounding.

Standard dual modulus KALSI SEALS brand seals constructed in accordance with U.S. Pat. No. 5,738,358 have poor exclusion edge contact pressure unless an exclusion edge chamfer is used. The FKM and TFE/P dual material seals of the present invention can have substantially the same modulus of elasticity, and therefore the exclusion edge contact pressure is substantially the same as a single material seal. Testing has shown that a significant compression set resistance advantage is still present when TFE/P-based first resilient sealing material layer 56, and the FKM-based second resilient sealing material layer 58 have approximately the same hardness.

It can be appreciated that other simplifications of the present invention are also possible. For example, a seal could have TFE/P-based first resilient sealing material layer 56, and a FKM-based second resilient sealing material layer 58 without incorporating one or more of a static sealing lip 26, a hydrodynamic inlet curvature 30, a blend location 32, a static exclusionary intersection 36, a width dimension W that varies, a dynamic exclusionary intersection 46, a dynamic control surface 48, or a static control surface 50. For example, FIG. 2 shows a seal that incorporates a static sealing lip 26, while in FIG. 2A the static sealing lip is absent. It can also be appreciated that the benefits provided by the dual material construction of this invention can be used advantageously in reciprocating service, as well as rotary service.

Figure 3:
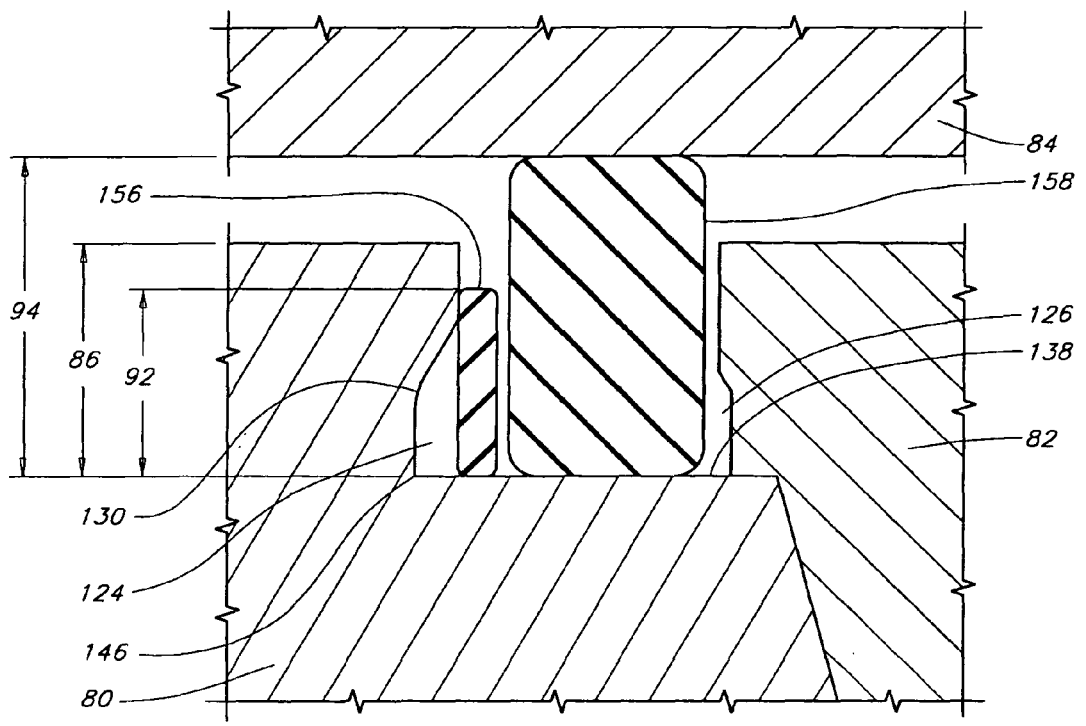
FIG. 3 is a fragmentary cross-sectional view of a mold for molding a composite dynamic seal according to a preferred embodiment of the present invention.

FIG. 3 shows the preferred molding process, including three of the preferred mold components: the mold core 80, the mold collar 82 and the mold cap 84. The mold of FIG. 3 is shown configured for molding the dynamic seal 2 of FIG. 2. The mold core 80 defines a cavity length 86 and incorporates a dynamic lip cavity 124 for forming the dynamic sealing lip 24, a cavity end surface 138 for forming the second seal end 38, an abrupt internal corner 146 for forming dynamic exclusionary intersection 46, and an internal curvature 130 for forming hydrodynamic inlet curvature 30 of the dynamic seal 2 of FIG. 2. The mold collar 82 incorporates a static lip cavity 126 for forming static sealing lip 26.

Preferably, an inner preform 156 and an outer preform 158, each of generally circular form, are positioned in the mold. Preferably, each of the preforms 156 and 158 are unvulcanized elastomers. The inner preform length 92 is preferably less than the cavity length 86, and the outer preform length 94 is preferably greater than the cavity length 86 and greater than the inner preform length 92. As the mold cap 84 is lowered it contacts the outer preform 158, which causes the outer preform 158 to expand radially and overhang the inner preform 156, holding the inner preform 156 in place against the cavity end surface 138 of the mold core 80. As the mold cap 84 is lowered further, the outer preform 158 continues to expand radially. This radial expansion forces the inner preform 156 into the dynamic lip cavity 124 and forces the outer preform 158 into the static lip cavity 126 of the mold collar 82.

This technique of making the inner preform 156 shorter than the outer preform 158 works with a variety of sealing materials. For example, the inner preform 156 can be a TFE/P elastomer, and the outer preform 158 can be an FKM elastomer. As another example, the inner preform 156 can be a polytetrafluoroethylene ("PTFE") based plastic, and the outer preform 158 can be an elastomer such as HSN or FKM, or a silicone-type elastomer.

Figure 4:
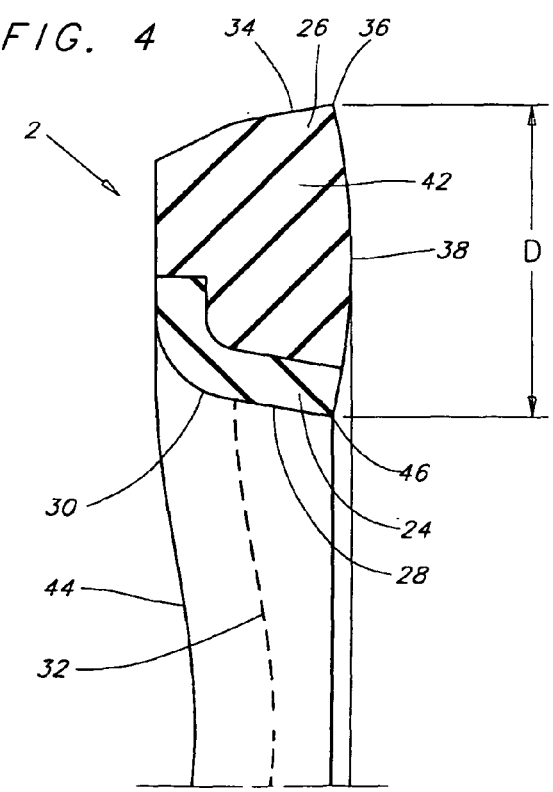
FIG. 4 is a fragmentary sectional view of a composite dynamic seal according to another preferred embodiment of the present invention, the composite dynamic seal having an inner dynamic sealing material layer and an outer static sealing material layer, the composite dynamic seal shown in an uncompressed condition and adapted for radial sealing.

In the seals of FIGS. 1-1D, dynamic control surface 48 and static control surface 50 of annular seal body 42 are preferably provided to prevent undue twisting of the installed seal within the seal groove. In FIG. 4, the dynamic control surface and the static control surface have been eliminated all the way back to the dynamic sealing lip 24 as a simplification, leaving the first seal end 44 wavy; i.e. non-circular. This arrangement is particularly suitable for applications where the pressure of the second fluid is higher than the pressure of the first fluid. To best exploit the seal of FIG. 4, the first groove wall can be made in a wavy, non-circular shape corresponding to the wavy shape of first seal end 44. If the first groove wall is made wavy so that it inter-fits with, and supports the wavy shape of first seal end 44, then forces acting against either first seal end 44 or second seal end 38 cannot completely flatten hydrodynamic inlet curvature 30 against the relatively rotatable surface, thereby preserving an efficient, gently converging relationship between hydrodynamic inlet curvature 30 and the relatively rotatable surface for maintaining efficient hydrodynamic film lubrication of dynamic sealing surface 28. As the temperature of an elastomer increases, its modulus decreases. Hydrodynamic lubrication makes the dynamic seal 2 run much cooler than comparable non-hydrodynamic seals, therefore the first resilient sealing material layer 56 retains its modulus of elasticity well, which promotes extrusion resistance. If the first groove wall is made wavy so that it inter-fits with, and supports the wavy shape of first seal end 44, then dynamic exclusionary intersection 46 is maintained in the intended substantially circular configuration for efficient environmental exclusion, despite forces acting against second seal end 38 that, in the prior art, compromise the performance of such exclusionary intersections.

As with the preferred embodiment, for all of the seals illustrated in the figures herein, the depth dimension D may, if desired, vary in time with the varying position of the hydrodynamic inlet curvature (and the variation in width dimension W of the interfacial contact footprint) to help even out interfacial contact pressure variations around the circumference of the seal.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. An interference-type rotary seal adapted for use in a high temperature environment between a first member and a second member allowed to move relative to the first member, the rotary seal comprising a seal body of generally ring-shaped configuration, said seal body comprising:

a first layer composed of a tetrafluoroethylene and propylene copolymer elastomer compound having a peroxide cure system, said first layer defining at least a portion of a dynamic sealing surface; and a second layer composed of a fluorocarbon rubber elastomer compound having a peroxide cure system, said second layer defining at least a portion of a static sealing surface, wherein said first and second layers are chemically cross-linked to each other and the bond between said first and second layers exceeding the strength of said second layer.

2. The rotary seal of claim 1, wherein said first layer has a first layer length and said seal body has a seal body length, and said first layer length is shorter than said seal body length.

3. The rotary seal of claim 1, wherein said dynamic sealing surface is a generally internally oriented surface configured for sealing against an externally oriented, generally cylindrical surface of the second member.

4. The rotary seal of claim 1, wherein said dynamic sealing surface is a generally externally oriented surface configured for sealing against an internally oriented, generally cylindrical surface of the second member.

5. The rotary seal of claim 1, wherein said dynamic sealing surface is a generally axially oriented surface configured for sealing against a substantially planar surface of the second member.

6. The rotary seal of claim 1, wherein said dynamic sealing surface has a width that varies.

7. The rotary seal of claim 1, wherein said dynamic sealing surface is of sloped configuration.

8. The rotary seal of claim 1, wherein said dynamic sealing surface is substantially cylindrical.

9. The rotary seal of claim 1, wherein said static sealing surface is of sloped configuration.

10. The rotary seal of claim 1, wherein said dynamic sealing surface is compressed against the second member and establishes an interfacial contact footprint of generally circular form having a width dimension that varies in size.

11. The rotary seal of claim 1, wherein said dynamic sealing surface is compressed against the second member and establishes an interfacial contact footprint having a first footprint edge that is wavy.

12. The rotary seal of claim 11, wherein said interfacial contact footprint has a second footprint edge that is substantially circular.

13. The rotary seal of claim 1, wherein said first layer defines a dynamic sealing lip defining a hydrodynamic inlet curvature and defining said dynamic sealing surface.

14. The rotary seal of claim 13, wherein said dynamic sealing lip defines a dynamic exclusionary intersection of substantially circular configuration.

15. The rotary seal of claim 13, wherein said second layer defines a static sealing lip of generally circular configuration, and in generally opposed relation to said dynamic sealing lip.

16. The rotary seal of claim 1, wherein said first layer is thinner than said second layer.

17. The rotary seal of claim 1, wherein said first layer and said second layer are molded and cured together simultaneously.

18. The rotary seal of claim 1, wherein said dynamic sealing surface is adapted to seal against the movable second member.

19. The rotary seal of claim 1, wherein said first layer includes a dynamic sealing lip defining a hydrodynamic inlet curvature.

20. The rotary seal of claim 1, wherein said tetrafluoroethylene and propylene copolymer elastomer compound has a first modulus of elasticity and said fluorocarbon rubber elastomer compound has a second modulus of elasticity that is approximately equal to said first modulus of elasticity.

21. The rotary seal of claim 1, wherein said tetrafluoroethylene and propylene copolymer elastomer compound has a first modulus of elasticity and said fluorocarbon rubber elastomer compound has a second modulus of elasticity that is less than said first modulus of elasticity.

22. An interference-type rotary seal adapted for use in a high temperature environment between a first member and a second member allowed to move relative to the first member, the rotary seal comprising a seal body of generally ring-shaped configuration, said seal body comprising:
- a first layer composed of a tetrafluoroethylene and propylene copolymer-based elastomer compound, said first layer defining at least a portion of a dynamic sealing surface; and
- a second layer composed of a fluorocarbon rubber-based elastomer compound, said second layer defining at least a portion of a static sealing surface,
- wherein said tetrafluoroethylene and propylene copolymer-based elastomer compound of said first layer and said fluorocarbon rubber-based elastomer compound of said second layer are chemically cross-linked to each other and the bond between said tetrafluoroethylene and propylene copolymer-based elastomer compound of said first layer and said fluorocarbon rubber-based compound of said second layer exceeding the strength of said fluorocarbon rubber-based compound.

23. The rotary seal of claim 22, wherein said tetrafluoroethylene and propylene copolymer-based elastomer compound has a peroxide cure system and said fluorocarbon rubber-based elastomer compound has a peroxide cure system.

24. A dynamic seal comprising a seal body of generally ring-shaped configuration, said seal body comprising:
- a first layer composed of tetrafluoroethylene and propylene copolymer compound having a first modulus of elasticity, said first layer defining at least a portion of a dynamic sealing surface and having a first layer thickness; and
- a second layer composed of fluorocarbon rubber compound having a second modulus of elasticity approximately equal to said first modulus of elasticity, said second layer defining at least a portion of a static sealing surface and having a second layer thickness, said second layer thickness being greater than said first layer thickness,
- wherein said first and second layers are chemically cross-linked to each other and the bond between said first and second layers exceeding the strength of said second layer.

25. The dynamic seal of claim 24, wherein said tetrafluoroethylene and propylene copolymer compound has a peroxide cure system and said fluorocarbon rubber compound has a peroxide cure system.

* * * * *